Patented Nov. 7, 1922.

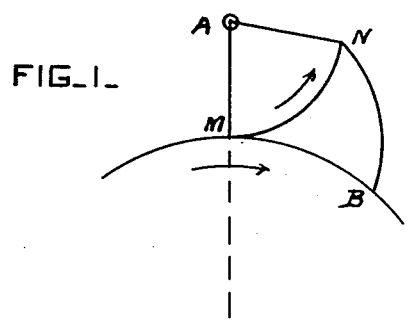
FIG_1_
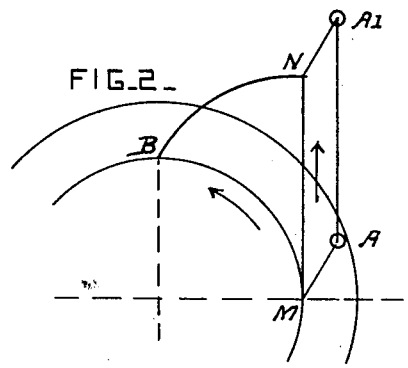
FIG_2_
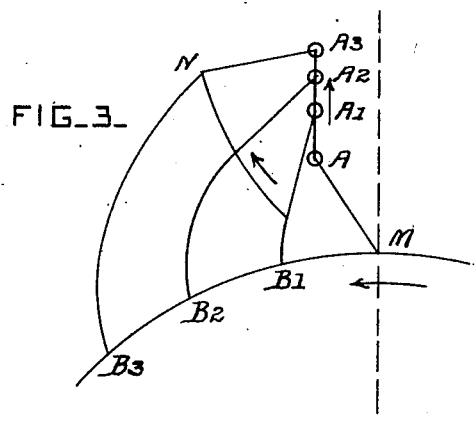
FIG_3_
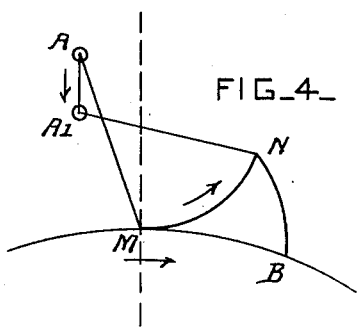
FIG_4_
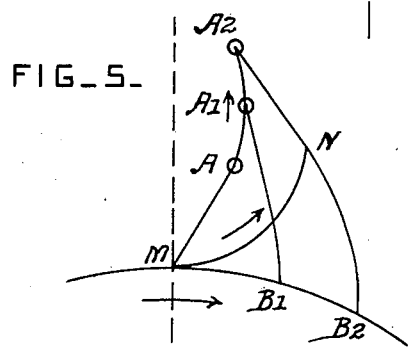
FIG_5_
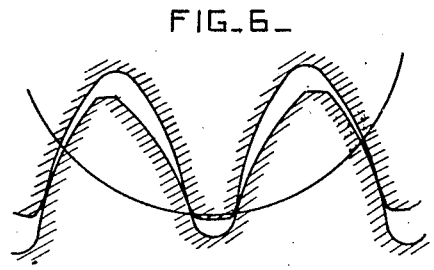
FIG_6_
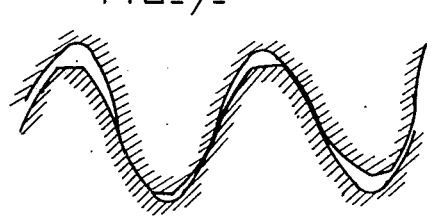
FIG_7_

1,434,987

UNITED STATES PATENT OFFICE.

FRANCIS JOHN BOSTOCK AND SWINFEN BRAMLEY-MOORE, OF NETHERTON, HUDDERSFIELD, ENGLAND.

GEAR TOOTH.

Application filed October 11, 1921. Serial No. 507,031.

*To all whom it may concern:*

Be it known that we, FRANCIS JOHN BOSTOCK and SWINFEN BRAMLEY-MOORE, subjects of King George V of Great Britain, residing at Netherton, Huddersfield, in the county of York, England, have invented a new and useful Improvement in and Relating to Gear Teeth, of which the following is a specification.

This invention relates to gear teeth. It is well known that in correctly designed gear teeth which provide uniform velocity transmission, lines drawn at right angles to the tooth contours from any points of contact between any two teeth always pass through the pitch point. The latter is, of course, the point where the two pitch circles touch each other. With involute gears these lines lie at a constant pressure angle, so that they all coincide. With cycloidal gears the obliquity of these lines is continually changing. A line drawn through all possible points of contact between any two gear teeth is termed the "line of action."

A "line of action" may be selected and tooth profiles constructed to correspond. If these tooth profiles are such that they only touch at points coinciding with this "line of action", and if normals to the tooth curves at their various points of contact always pass through the "pitch point" then the gears will provide uniform velocity transmission.

To make satisfactory commercial gears, however, something more is required than the ability to provide uniform velocity transmission. In the first place the tooth profiles should be capable of being easily and accurately reproduced. Secondly the sliding action between the gear teeth should be reduced to a minimum, thereby reducing wear and increasing the efficiency. Thirdly, the configuration of the teeth of any two gears should closely conform to each other so as to increase their load carrying capacity. Fourthly, the obliquity of the line of action should be as low as possible in order to reduce the thrust tending to separate the gear shafts, and fifthly, the section of the gear teeth should be as strong as possible in order to reduce the stresses in the material when under load.

There are two well known systems of gear teeth—the cycloidal and the involute—but neither of these conform to all the above requirements. Cycloidal gears are of the "double curve" type and these do not lend themselves to accurate and rapid reproductions. This defect can be remedied by making the teeth of one gear all addendum and the teeth of the other all dedendum, so as to present single curve profiles. But this arrangement is equally objectionable as it greatly increases the obliquity of the line of action. For these and other reasons cycloidal gear teeth are not usually manufactured, having been largely superseded by the involute system. The latter has, however, various disadvantages. The ratio of sliding to rolling of one gear tooth upon the other is unduly high. Moreover the tooth profiles of involute gear teeth are always convex, except in the case of a rack which is straight sided. But two convex surfaces, in contact with each other, are not well adapted to carry heavy loads. It is often found that when involute gears are run under heavy load a peculiar pitting or erosion of the teeth takes place near the pitch line. This trouble is caused by the rubbing action of two convex surfaces.

The object of the present invention is to provide gearing which shall fulfil the necessary conditions for uniform velocity transmission, high efficiency and heavy load carrying capacity, without the attendant drawbacks of the present day involute and cycloidal systems of gear teeth. Thus our object is to provide gear teeth which possess the following characteristics:

1. Easy to manufacture.
2. Small sliding action between gear teeth.
3. Tooth profiles envelop each other, providing very large area of tooth contact.
4. Section of gear tooth unusually strong.
5. Low obliquity on line of action.

The existing cycloidal and involute tooth curves are illustrated by Figs. 1 and 2 respectively, and our new enveloping tooth curve, the subject of the present invention, by Figs. 3 to 7 inclusive.

In Fig. 1 the line of action MN for a cycloidal gear is traced out by the arm AM revolving about the fixed pivot point A. This line of action Mn is, of course, part of a circle. If the gear blank be revolved at a suitable relative speed whilst the pivot arm moves from M to N, then the end of the pivot arm traces out—relative to the blank—the epicycloidal tooth curve BN.

In Fig. 2 the line of action MN for an involute gear is traced out by the fixed arm AM attached to a pivot point A which moves in a straight line parallel to a tangent to the base circle MB. This line of action is, of course, a straight line. If the gear blank be revolved at a suitable relative speed whilst the pivot point moves from A to A¹ then the end of the fixed pivot arm traces out—relative to the blank—the involute tooth curve BN.

In our invention, illustrated by Figs. 3 to 6, the line of action is represented by MN. In the cycloidal system the pivot arm revolves whilst the pivot point remains stationary and in the involute system the pivot arm remains stationary whilst the pivot point is moved tangentially to the gear blank. In our invention, providing the "enveloping" system of gear teeth, the line of action is traced out by the combined movements of pivot arm and pivot point. The arm and pivot point are moved at a constant relative speed to each other. As the pivot arm AM is revolved, so the pivot point A is simultaneously moved, and if the gear blank be revolved at a suitable relative speed then the end of the pivot arm traces out—relative to the blank—the enveloping tooth curve such as B3N as shown in Fig. 3. The enveloping curves B¹ and B² correspond to intermediate positions of the pivot point lettered A¹ and A².

Fig. 4 shows the pivot point A moving towards the gear blank, so that the position A¹ corresponds to the enveloping tooth curve BN.

Fig. 5 shows the pivot point A moving in a curved path to the point A² so that the end of the pivot arm traces out—relative to the blank—the enveloping tooth curves B¹ and B² corresponding to the pivot point positions A¹ and A².

Fig. 6 shows a few teeth, made according to our invention, in mesh with each other, NMN being the line of action as before and M the pitch point of the gears. In these, the enveloping tooth profiles are generated on one side only of the pitch line, whilst Fig. 7 shows the enveloping tooth profiles generated both above and below the pitch line.

The line of action is always controlled by the relative movements of the pivot point and pivot arm irrespective of any blank. The enveloping tooth form is generated by the combined movements of the pivot point and pivot arm, in conjunction with the movement of the blank, and it will be obvious that the same results will obtain if the motion be given wholly or partially to the generating system, comprising pivot point and pivot arm, instead of to the blank. In fact there are three fundamentals under consideration, the pivot point, the pivot arm, and the movement of the blank, and it will be clear that any of these may be stationary so long as the others are moved in such a way that the desired relative movement of the combination is obtained.

It will be understood that when the radius of the blank becomes infinitely large its circumference becomes a straight line, so that its rotation develops into a straight line motion.

The line of action is independent of the size of the blank, whilst the enveloping tooth form will naturally vary according to the radius of the blank. As, however, they are all controlled by the same line of action, the enveloping tooth forms will all be conjugate to each other.

It is well known that the length of the pivot arm AM, as shown in Fig. 1, may be varied to suit the particular form of cycloidal tooth required. When the diameter of the generating circle is too small it shortens the line of action between the gears and increases its obliquity. In the case of involute gears it is also well known that the path of travel of the pivot point A can be varied to suit the particular form of involute tooth required. When the diameter of the base circle is reduced, (the pitch circle remaining unaltered) then the obliquity of the line of action is increased and the section of the gear tooth altered thereby. Throughout all these changes, however, in the length of the pivot arm AM, or in the path of the pivot point A, the gears remain cycloidal or involute as the case may be. In the same way with our invention the length of the pivot arm AM and the path of the pivot point A may be varied to suit the particular form of enveloping tooth required, but whatever variations may be selected the type of tooth curve remains unaltered.

It must be understood that Figs. 3 to 6 only represent typical examples of the practical application of our invention. All those who understand the art of generating gear teeth will readily understand that many variations can be made (as in the case of cycloidal or involute gear teeth) whereby the line of action may be lengthened or shortened and its obliquity increased or decreased, but it is considered that the examples shown illustrate the spirit of our invention.

Having thus described our invention, what we claim as new and desire to secure by Letters Patent is:—

1. An enveloping form of gear tooth which is controlled by a line of action which is the path traced out by a point on the end of a swinging pivot arm carried by a moving pivot point, said arm and point moving at a constant relative speed to each other, as and for the purpose set forth.

2. An enveloping form of gear tooth produced by the path traced out by a point on the end of a swinging pivot arm carried by a moving pivot point, said arm and point moving at a constant relative speed to each other, relative to a gear blank rotating (or moving in the case of a rack) at a predetermined speed as and for the purpose set forth.

3. An enveloping form of gear tooth and its controlling line of action both of which are simultaneously traced out by a point on the end of a swinging pivot arm carried by a moving pivot point, said arm and point moving at a constant relative speed to each other, relative to a gear blank rotating (or moving along its pitch line in the case of a rack) at a predetermined speed as and for the purpose set forth.

4. An enveloping form of gear tooth and its controlling line of action both of which are dependent upon the relative movements, one to the others, of a point on the end of a pivot arm, a pivot point, said arm and point moving at a constant relative speed to each other, and a gear blank, the combined movements being arranged to produce an enveloping form of gear tooth as already set forth in claims 1, 2 and 3.

In testimony whereof we affix our signatures.

FRANCIS JOHN BOSTOCK.
SWINFEN BRAMLEY-MOORE.